(12) United States Patent
Suzuki

(10) Patent No.: US 10,841,860 B2
(45) Date of Patent: Nov. 17, 2020

(54) CONTROL DEVICE, COMMUNICATION RELAY DEVICE, COMMUNICATION SYSTEM AND COMMUNICATION CONTROL METHOD

(71) Applicant: Yamaha Corporation, Hamamatsu (JP)

(72) Inventor: Hirokazu Suzuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/360,558

(22) Filed: Mar. 21, 2019

(65) Prior Publication Data

US 2019/0297559 A1 Sep. 26, 2019

(30) Foreign Application Priority Data

Mar. 22, 2018 (JP) .................................. 2018-055088

(51) Int. Cl.
*H04W 48/02* (2009.01)
*H04W 76/15* (2018.01)
*H04W 88/04* (2009.01)

(52) U.S. Cl.
CPC ........... *H04W 48/02* (2013.01); *H04W 76/15* (2018.02); *H04W 88/04* (2013.01)

(58) Field of Classification Search
CPC ..... H04W 48/02; H04W 76/15; H04W 88/04; H04W 84/12
See application file for complete search history.

(56) References Cited

U.S. PATENT DOCUMENTS

| 9,838,923 | B1* | 12/2017 | Sitton | .................... H04W 76/30 |
| 2008/0031212 | A1* | 2/2008 | Ogura | .................... H04W 28/16 |
| | | | | 370/338 |
| 2008/0153454 | A1* | 6/2008 | Haapapuro | ............. H04W 4/90 |
| | | | | 455/404.1 |
| 2009/0290489 | A1 | 11/2009 | Wang et al. | |
| 2013/0295989 | A1* | 11/2013 | Smadi | ............... H04W 72/1215 |
| | | | | 455/553.1 |
| 2014/0003230 | A1* | 1/2014 | Mathur | .................. H04W 24/02 |
| | | | | 370/229 |
| 2015/0237567 | A1* | 8/2015 | Xue | ....................... H04W 48/16 |
| | | | | 455/552.1 |
| 2015/0256546 | A1* | 9/2015 | Zhu | ........................ H04W 12/08 |
| | | | | 726/4 |
| 2016/0073433 | A1* | 3/2016 | Kwon | ............... H04W 74/0891 |
| | | | | 370/338 |
| 2016/0227473 | A1* | 8/2016 | Bhanage | ................ H04W 16/00 |
| 2017/0245164 | A1* | 8/2017 | Jiang | ................ H04W 74/0808 |
| 2019/0075549 | A1* | 3/2019 | Yucek | .................... H04W 16/00 |

FOREIGN PATENT DOCUMENTS

JP 2009-284487 A 12/2009

* cited by examiner

*Primary Examiner* — Chi Ho A Lee
(74) *Attorney, Agent, or Firm* — Crowell & Moring LLP

(57) ABSTRACT

A control device includes a memory that stores instructions and a processor that executes the instructions. The instructions cause the processor to perform: controlling, based on a first number of communication terminals to which a first module performs radio communication and a second number of communication terminals to which a second module performs radio communication, whether to permit the communication terminal having made a request for connection to the first module to connect to the first module or not.

20 Claims, 6 Drawing Sheets

FIG. 2

| MODULE | CHANNEL | NUMBER OF CONNECTIONS TO COMMUNICATION TERMINALS |
|---|---|---|
| Ma | Ch(Ma) | Ca |
| Mb | Ch(Mb) | Cb |

FIG. 3

| COMMUNICATION TERMINAL | MODULE | LAST ACCESS |
|---|---|---|
| 3a | Ma | Ta |
| 3b | Mb | Tb |
| ⋮ | ⋮ | ⋮ |

CONTROL DEVICE, COMMUNICATION RELAY DEVICE, COMMUNICATION SYSTEM AND COMMUNICATION CONTROL METHOD

CROSS REFERENCE TO RELATED APPLICATIONS

This application is based on Japanese Patent Application (No. 2018-055088) filed on Mar. 22, 2018, the contents of which are incorporated herein by reference.

BACKGROUND OF THE INVENTION

1. Field of the Invention

The present invention relates to a technology of controlling communication.

2. Description of the Related Art

By making the same connection restriction setting (security setting) at an access point having a plurality of radio communication modules, for example, a roaming technology is realized. Although communication terminals as clients can connect to any of the communication modules, there are cases where while many communication terminals are connected to one communication module, hardly any communication terminals are connected to the other communication modules. Such an imbalance in the number of connected communication terminals deteriorates the radio performance of the access point as a whole. Accordingly, a technology for decentrally connecting communication terminals has been developed (for example, JP-A-2009-284487).

According to the technology disclosed in JP-A-2009-284487, since the load is distributed by complex processing and such processing is conducted after the authentication processing of the communication terminal, processing takes time as a whole, which deteriorates user convenience.

SUMMARY

One of objects of the present invention is to efficiently distribute the communication terminals connected to a plurality of communication modules.

According to one of exemplary embodiments of the present invention, there is provided a control device including: a memory that stores instructions; and a processor that executes the instructions, and the instructions cause the processor to perform: controlling, based on a first number of communication terminals to which a first module performs radio communication and a second number of communication terminals to which a second module performs radio communication, whether to permit the communication terminal having made a request for connection to the first module to connect to the first module or not.

Moreover, according to one of exemplary embodiments of the present invention, there is provided a control method including: controlling, based on a first number of communication terminals to which a first module performs radio communication and a second number of communication terminals to which a second module performs radio communication, whether to permit the communication terminal having made a request for connection to the first module to connect to the first module or not.

According to one of the exemplary embodiments of the present invention, the communication terminals connected to a plurality of radio communication modules can be efficiently distributed.

BRIEF DESCRIPTION OF THE DRAWINGS

FIG. 2 is a view explaining a module management table in the first embodiment of the present invention.

FIG. 3 is a view explaining a connection terminal management table in the first embodiment of the present invention.

DETAILED DESCRIPTION OF THE EXEMPLARY EMBODIMENTS

Figure 1:
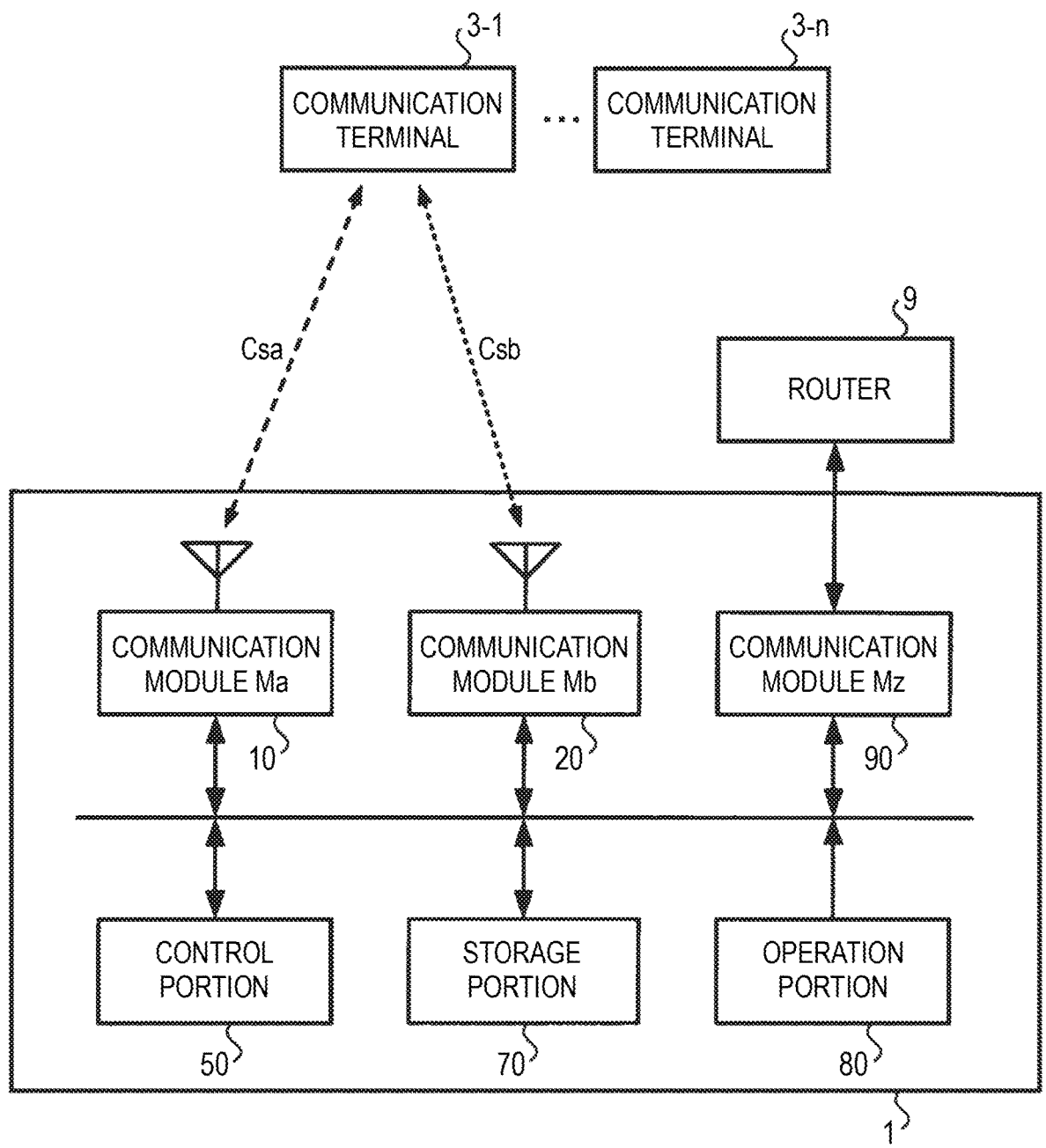
FIG. 1 is a view explaining the structure of a communication system in a first embodiment of the present invention.

Hereinafter, communication systems in embodiments of the present invention will be described in detail with reference to the drawings. The embodiments shown below are examples of embodiments of the present invention, and the present invention should not be interpreted within the bounds of these embodiments. In the drawings referred to in these embodiments, the same parts or parts having similar functions are denoted by the same reference designations or similar reference designations (reference designations formed of numerals just followed by A, B or the like), and repetitive descriptions thereof are sometimes omitted.

First Embodiment

[1. Overview]

A communication system in a first embodiment of the present invention is implemented by an access point that relays radio communication. This access point is a communication relay device having a plurality of radio communication modules, and is capable of distributing the communication terminals connected to the communication modules by the method described below. The access point in the first embodiment will be described. The communication system may be implemented by a router instead of the access point.

[2. Structure of the Access Point]

FIG. 1 is a view explaining the structure of a communication system in the first embodiment of the present invention. The access point 1 provides communication terminals 3-1, . . . , 3-$n$ (hereinafter, referred to as communication terminal 3 when they are not specifically distinguished from one another) with a wireless LAN environment, and performs relay for connecting the communication terminal 3 to a WAN (the Internet, etc.) through a router 9.

The access point 1 includes a communication module Ma10 (hereinafter, sometimes referred to merely as "Ma"), a communication module Mb20 (hereinafter, sometimes referred to merely as "Mb"), a control portion 50, a storage portion 70, an operation portion 80 and a communication module Mz90. These elements are interconnected by buses.

The communication system in this example includes the communication module Ma10, the communication module Mb20 and the control portion 50, and constitutes part of the access point 1 by being accommodated in one housing.

The communication module Ma10 executes a radio communication Csa with the communication terminal 3 by using, of the channels in the 5 GHz band, a channel that is set by the control portion 50. The communication module Mb20 executes a radio communication Csb with the communication terminal 3 by using, of the channels in the 5 GHz band, a channel that is set by the control portion 50. The channel that is set to the communication module Mb20 is different from the channel that is set to the communication module Ma10. While the communication modules Ma10 and Mb20 perform radio communication by using the 5 GHz band in this example, they may perform radio communication using a different frequency band. At this time, although it is desirable that the frequency band used by the communication module Ma10 and the frequency band used by the communication module Mb20 be the same, the present invention is not always limited to the case where the frequency band used by the communication module Ma10 and the frequency band used by the communication module Mb20 are the same.

Although the channels that are set to the communication module Ma10 and the communication module Mb20 are different from each other as described above, for example, identification information for connecting to the communication modules Ma10 and Mb20 such as SSID (Service Set IDentifier) and other settings (for example, the transmission/ reception rate set, the security setting) are the same. By doing this, even if the communication module that communicates with the communication terminal 3 is changed, the communication terminal 3 can perform communication as it is only by changing the setting of the channel being used. To the communication terminal 3, this is an operation similar to roaming between access points. Some settings may be different between the communication module Ma10 and the communication module Mb20.

In this example, the communication module Mz90 has the function as a communication portion for communicating with the router 9 and communicating with other devices through the router 9. This communication may be, for example, by radio or by cable.

The storage portion 70 stores a control program executed by the control portion 50 and information such as various tables. The tables stored in the storage portion 70 include, for example, management tables as shown in FIG. 2 and FIG. 3 described later, and are updated by the control portion 50. The operation portion 80 includes operation members such as a power button and a setting button, accepts user's operations on the operation members, and outputs signals responsive to the operations to the control portion 50.

FIG. 2 is a view explaining a module management table in the first embodiment of the present invention. The module management table is a table where information related to the communication modules Ma10 and Mb20 is registered. Specifically, the module management table associates, for the communication modules, the channels (Ch(Ma), Ch(Mb)) that are set to the communication modules with the number of communication terminals 3 (Ca, Cb) connected to the communication modules.

FIG. 3 is a view explaining a connection terminal management table in the first embodiment of the present invention. In the connection terminal management table, the history of the connections of the communication terminal 3 to the communication terminals Ma10 and Mb20 is registered. Specifically, the connection terminal management table associates, for the communication terminals ($3a$, $3b$, . . . ), the communication modules (Ma, Mb, . . . ) to which the communication terminals are connected, with time information (Ta, Tb, . . . ) on the times of last accesses. In this example, MAC (media access control) addresses are used as the information to distinguish the communication terminals. The number of communication terminals 3 associated with the communication module Ma10 in the connection terminal management table corresponds to the above-mentioned number Ca of connections. Likewise, the number of communication terminals 3 associated with the communication module Mb2 in the connection terminal management table corresponds to the above-mentioned number Cb of connections.

The communication terminal 3 where a predetermined time (for example, five minutes) has elapsed since the last access is processed by the control portion 50 so that the registration thereof is deleted from the connection terminal management table. Thereby, the connection history of this communication terminal 3 is deleted. Moreover, when the same terminal as the communication terminal 3 associated with one communication module is associated with another communication module, the connection history related to the communication module associated earlier may be deleted. For example, when the communication terminal 3 associated with the communication module Ma10 is connected to the communication module Mb20 because of a change in connection status, for the communication terminal 3, it may be performed to newly register the connection history associated with the communication module Mb20 and delete the connection history associated with the communication module Ma10. As a result, the number Ca of connections decreases in tandem.

Returning to FIG. 1, description will be continued. The control portion 50 includes an arithmetic processing circuit such as a CPU, and a memory. The control portion 50 executes the control program stored in the storage portion 70 by the CPU to implement various functions at the access point 1. The implemented functions include a communication control function. According to this communication control function, later-described processing (hereinafter, referred to as communication control processing) can be executed.

The control program may be any that is executable by a computer, and may be provided in a state of being stored in a computer-readable recording medium such as a magnetic recording medium, an optical recording medium, a magneto-optical recording medium or a semiconductor memory. In this case, the access point 1 may be any that is provided with a device that reads the recording medium. Moreover, the control program may be downloaded through a communication module. Subsequently, the communication control processing (communication control method) will be described.

[3. Communication Control Processing]

The communication control processing is started by the power-on at the access point 1. According to the communication control processing in this example, by setting a MAC address filter of a white list form to the communication modules Ma10 and Mb20, the control portion 50 controls whether to permit connection or not in response to a connection request from the communication terminal 3 to the communication modules.

Figure 4:
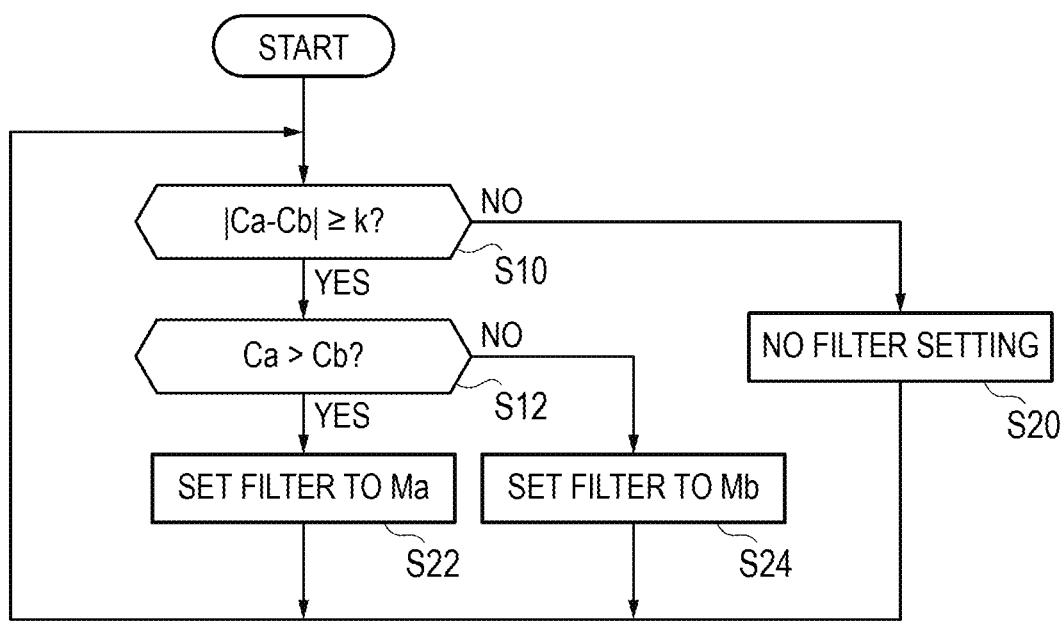
FIG. 4 is a flowchart explaining communication control processing in the first embodiment of the present invention.

FIG. 4 is a flowchart explaining the communication control processing in the first embodiment of the present invention. When the communication control processing is started, it is determined whether the difference between the number Ca of connections and the number Cb of connections is not less than a predetermined number k or not (step S10). Here, k is only necessarily an integer of not less than 1, and is 1 in this example. That is, in this example, the determination at step S10 is equal to a determination as to whether the number Ca of connections and the number Cb of connections are the same or not.

While determining that the difference between the number Ca of connections and the number Cb of connections is less than the predetermined number k (step S10; No), the control portion 50 makes the setting of the filter absent for both of the communication modules Ma10 and Mb20 (step S20). In this situation, since no filter is set to the communication module Ma10 or Mb20, connection is permitted for the connection requests from all the communication terminals 3.

On the other hand, while determining that the difference between the number Ca of connections and the number Cb of connections is not less than the predetermined number k (step S10; Yes) and determining that the number Ca of connections is larger than the number Cb of connections (step S12; Yes), the control portion 50 sets the filter only to the communication module Ma10 (step S22). In other words, this period is a state where the number Ca of connections is larger than the number Cb of connections by not less than the predetermined number k. In this example, the control portion 50 generates a white list including the communication terminals 3 where the histories of connection to the communication module Ma10 are registered, based on the connection terminal management table, and sets the filter to the communication module Ma10. Thereby, the communication module Ma10 refuses connection in response to the connection requests from other than the communication terminals 3 registered in the white list. On the other hand, the communication module Mb20 to which no filter is set permits connection in response to the connection requests from all the communication terminals 3.

While determining that the difference between the number Ca of connections and the number Cb of connections is not less than the predetermined number k (step S10; Yes) and not determining that the number Ca of connections is larger than the number Cb of connections (step S12; Yes), the control portion 50 sets the filter only to the communication module Mb20 (step S24). In other words, this period is a state where the number Cb of connections is larger than the number Ca of connections by not less than the predetermined number k. In this example, the control portion 50 generates a white list including the communication terminals 3 where the histories of connection to the communication module Mb20 are registered, based on the connection terminal management table, and sets the filter to the communication module Mb20. Thereby, the communication module Mb20 refuses connection in response to the connection requests from other than the communication terminals 3 registered in the white list. On the other hand, the communication module Ma10 to which no filter is set permits connection in response to the connection requests from all the communication terminals 3.

By setting the filter to the communication modules Ma10 and Mb20 by the communication control processing as described above, the control portion 50 performs control so that connection is refused in response to the requests from the communication terminals 3 to the communication module where the number of connected terminals is larger than that of the other communication module by not less than the predetermined number k. Thereby, when connection to a communication module is refused, the communication terminal 3 repeats the request for connection to any of the communication modules until connection is permitted. As a result, at the access point 1, the communication terminals 3 are never connected more unevenly than the predetermined number k to only one of the communication modules Ma10 and Mb20.

By the above-described setting of the predetermined number k, the degree of unevenness of the number of connections can be set. If it is set as k=1 as in this example, the difference in number of connections is permitted up to one. In this case, the state is such that the communication terminals 3 are connectable to both only when the numbers of connections at the communication modules Ma10 and Mb20 are the same. On the other hand, if the number is set as k=3, the difference in number of connections is permitted up to three. In this case, the state is such that the communication terminals 3 are connectable to both if the difference between the numbers of connections of the communication modules Ma10 and Mb20 is up to two. By thus permitting moderate unevenness, the state can also be reduced where connection of the communication terminals 3 to the communication modules is refused.

Moreover, if the communication terminals 3 remain registered in the connection terminal management table, even if radio communication is disconnected because of some communication situation, it is possible to re-connect to the same communication module irrespective of the number of connections. This is because even if the filter is set to the communication module, the communication terminal 3 is included in the white list.

Second Embodiment

While in the first embodiment, the communication control processing using the MAC address filter of the white list form is used, in a second embodiment, communication control processing is used where whether to permit connection or not is controlled every time a connection request is received from the communication terminal 3.

Figure 5:
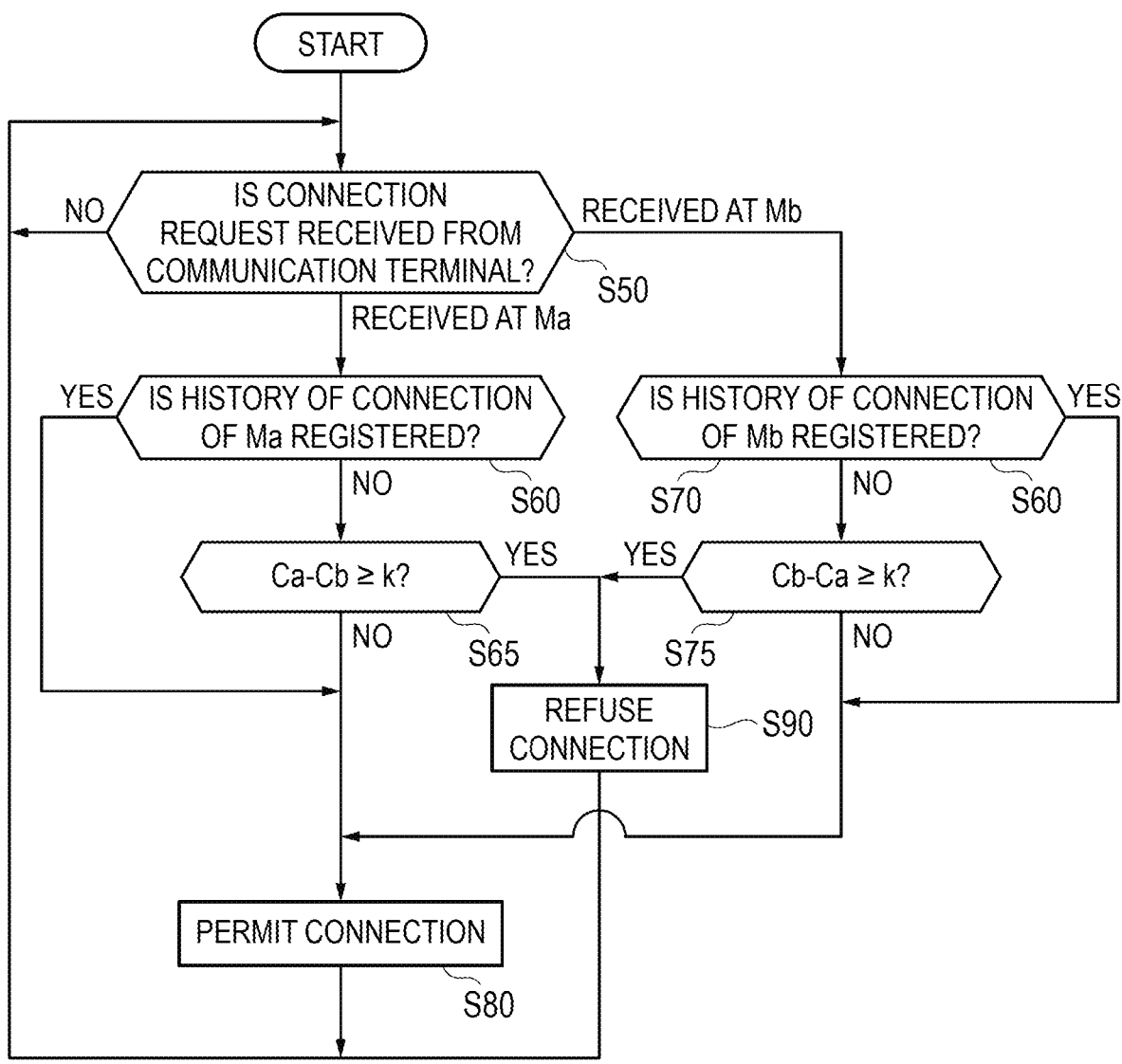
FIG. 5 is a flowchart explaining communication control processing in a second embodiment of the present invention.

FIG. 5 is a flowchart explaining the communication control processing in the second embodiment of the present invention. When the communication control processing is started, the control portion 50 waits for a request for connection to the communication modules Ma10 and Mb20 to be received from the communication terminal 3 (step S50; No). In the following description, this state will be referred to as request waiting state. When receiving a request for connection to the communication module Ma10 from the communication terminal 3 (step S50; received at Ma), the control portion 50 determines whether a history of connection of this communication terminal 3 to the communication module Ma10 is registered or not with reference to the connection terminal management table (step S60).

When determining that the history of connection of the communication terminal 3 to the communication module Ma10 is registered (step S60; Yes), the control portion 50 permits the communication terminal 3 to connect to the communication module Ma10 (step S80), and reverts to the request waiting state (step S50; No). When determining that the history of connection of the communication terminal 3 to the communication module Ma10 is not registered (step S60; No), the control portion 50 determines whether the difference when the number Cb of connections is subtracted from the number Ca of connections is not less than the predetermined number k or not (step S65). Here, k is only necessarily an integer of not less than 1, and is 1 in this example.

When determining that the difference when the number Cb of connections is subtracted from the number Ca of connections is not less than the predetermined number k (step S65; Yes), the control portion 50 refuses connection of the communication terminal 3 to the communication module Ma10 (step S90), and reverts to the request waiting state (step S50; No).

On the other hand, when determining that the difference when the number Cb of connections is subtracted from the number Ca of connections is less than the predetermined number k (step S65; No), the control portion 50 permits the communication terminal 3 to connect to the communication module Ma10 (step S80), and reverts to the request waiting state (step S50; No).

At step S50, when receiving a request for connection to the communication module Mb20 from the communication terminal 3 (step S50; received at Mb), the control portion 50 determines whether a history of connection of this communication terminal 3 to the communication module Mb20 is registered or not with reference to the connection terminal management table (step S70).

When determining that the history of connection of the communication terminal 3 to the communication module Mb20 is registered (step S70: Yes), the control portion 50 permits the communication terminal 3 to connect to the communication module Mb20 (step S80), and reverts to the request waiting state (step S50; No). When determining that the history of connection of the communication terminal 3 to the communication module Mb20 is not registered (step S70; No), the control portion 50 determines whether the difference when the number Ca of connections is subtracted from the number Cb of connections is not less than the predetermined number k or not (step S75). Here, k is only necessarily an integer of not less than 1, and is 1 in this example. The set value of k used at step S65 and the set value of k used at step S75 may be different.

When determining that the difference when the number Ca of connections is subtracted from the number Cb of connections is not less than the predetermined number k (step S75; Yes), the control portion 50 refuses connection of the communication terminal 3 to the communication module Mb20 (step S90), and reverts to the request waiting state (step S50; No).

On the other hand, when determining that the difference when the number Ca of connections is subtracted from the number Cb of connections is less than the predetermined number k (step S65; No), the control portion 50 permits the communication terminal 3 to connect to the communication module Ma10 (step S80), and reverts to the request waiting state (step S50; No). By this processing, similar operational advantages to those of the first embodiment can be obtained.

Third Embodiment

While the communication module Ma10 and the communication module Mb20 are accommodated in the same housing (access point 1) in the first embodiment, in a third embodiment, they are accommodated in different housings (access points 1A and 1B).

Figure 6:
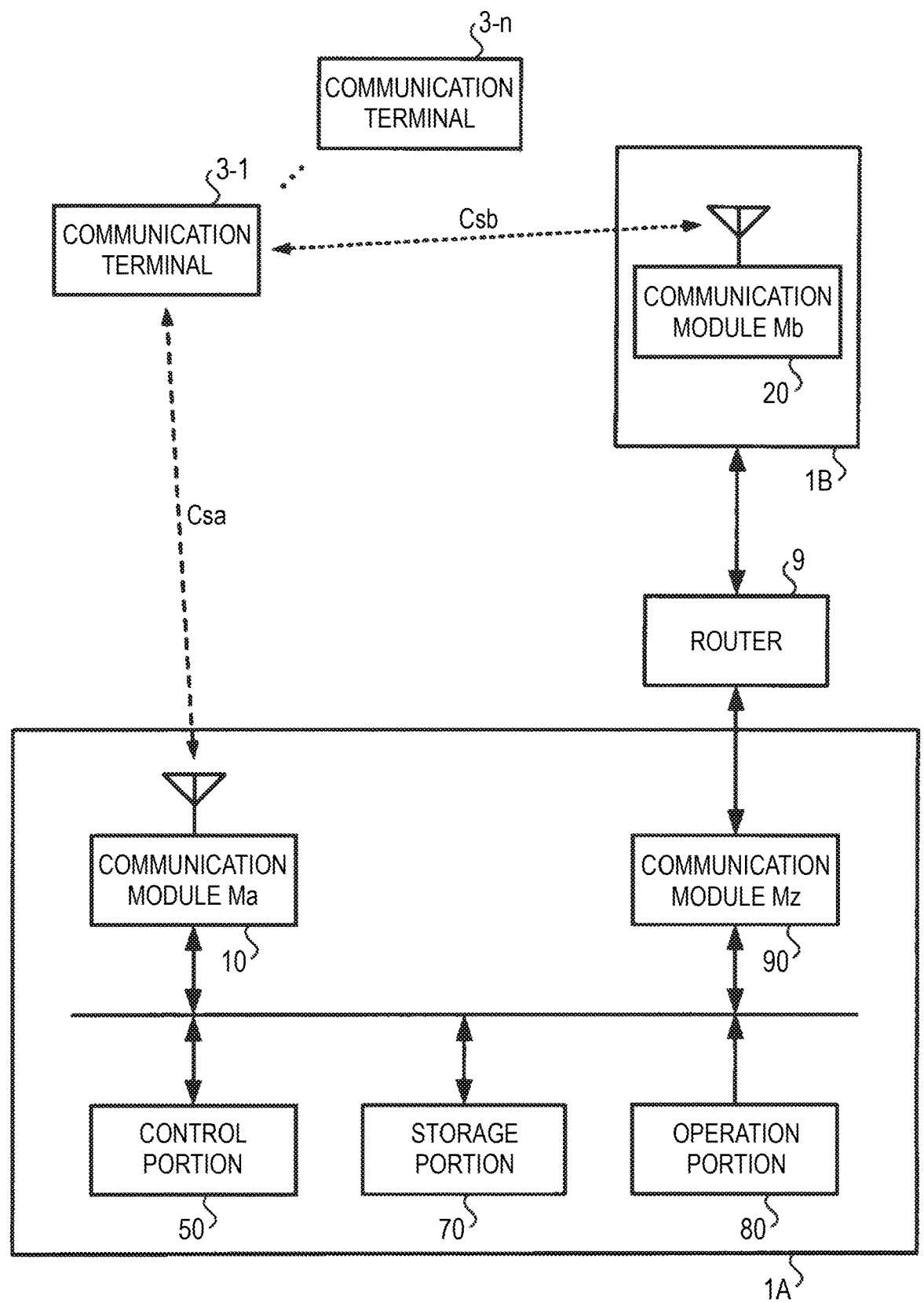
FIG. 6 is a view explaining the structure of a communication system in a third embodiment of the present invention.

FIG. 6 is a view explaining the structure of a communication system in the third embodiment of the present invention. As shown in FIG. 6, the access point 1A has a structure where the communication module Mb20 is removed from the access point 1 of the first embodiment. On the other hand, the access point 1B of another housing has the communication module Mb20. The access point 1A and the access point 1B are connected through the router 9 in this example. For this reason, the control portion 50 of the access point 1A transmits a control signal for controlling the communication module Mb20 to the access point 1B through the router 9. Thereby, when this control signal is received at the access point 1B, the communication module Mb20 is controlled according to the control signal. Moreover, a signal indicative of information at the access point 1B (including, for example, information indicating that the communication terminal 3 is connected) is received by the control portion 50 of the access point 1A through the router 9. For this reason, processing similar to the communication control processing executed at the access point 1 in the first embodiment can be substantially implemented by the cooperation between the access points 1A and 1B in the third embodiment. The function of the access point 1A may be implemented by a router.

Fourth Embodiment

In the third embodiment, the structure is different from that of the first embodiment in that the communication module Mb20 is accommodated in the access point 1B as another housing. In a fourth embodiment, further, an example will be described in which the communication module Ma10 is also implemented in a housing different from the control portion 50.

Figure 7:
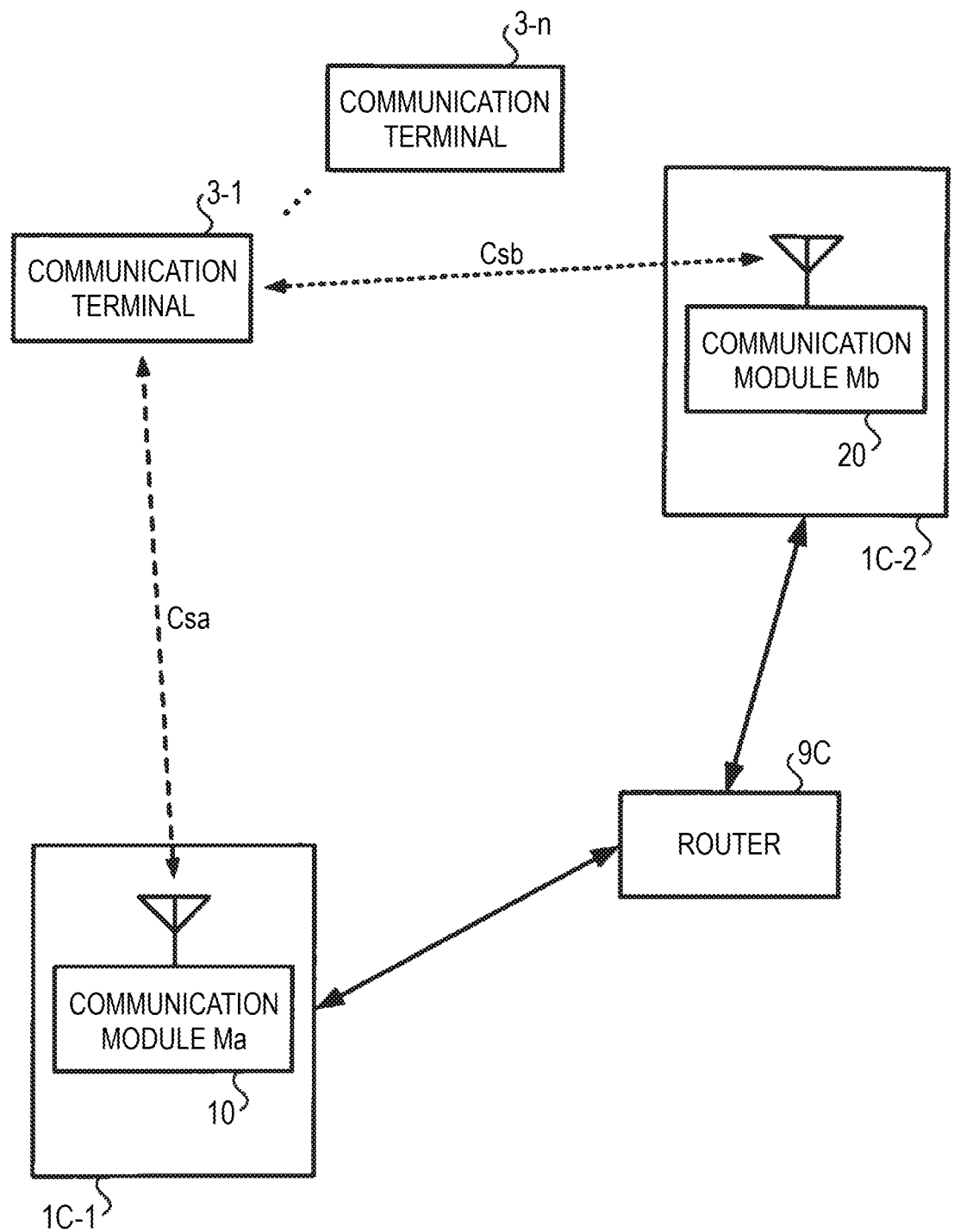
FIG. 7 is a view explaining the structure of a communication system in a fourth embodiment of the present invention.

FIG. 7 is a view explaining the structure of a communication system in the fourth embodiment of the present invention. As shown in FIG. 7, the communication module Ma10 is accommodated in an access point 1C-1, and the communication module Mb20 is accommodated in an access point 1C-2. On the other hand, the control portion 50 that executes the communication control processing in the first embodiment is accommodated in a router 9C (control device). In this case, the control portion of the router 9C transmits a control signal for controlling the communication module Ma10 to the access point 1C-1. Thereby, when this control signal is received at the access point 1C-1, the communication module Ma10 is controlled according to the control signal. Moreover, a control signal for controlling the communication module Mb20 is transmitted to the access point 1C-2. Thereby, when this control signal is received at the access point 1C-2, the communication module Mb20 is controlled according to the control signal. For this reason, processing similar to the communication control processing executed at the access point 1 in the first embodiment can be substantially implemented by the cooperation between the access points 1C-1 and 1C-2 and the router 9C in the fourth embodiment. The function of the control portion 50 may be possessed by another device (control device) connected through the router 9C. In any case, it is necessary only that the communication system be constituted by a control device including the control portion 50 that controls the communication modules Ma10 and Mb20 and the communication modules Ma10 and Mb20. For example, as described above, the control device may be the control portion 50 included in the access point or the router, or may be a device that controls them.

<Modifications>

While embodiments of the present invention have been described above, the embodiments of the present invention may be modified in various forms as shown below. Moreover, the above-described embodiments and the modifications described below may be applied in combination.

(1) While in the above-described embodiments, whether to permit connection or not in response to a request from the communication terminal 3 is controlled based on the number of connections of the communication terminals 3 to the communication modules Ma10 and Mb20, whether to permit connection or not may be controlled along with another piece of information (for example, communication situation). For example, whether to permit connection or not may be controlled based on the traffic (average traffic per predetermined time) at the communication modules Ma10 and Mb20 and the above-described number of connections. In this case, whether to permit connection or not is controlled by processing similar to that of the above-described embodiment with weights being assigned, for example, by multiplying the number of connections by the communication traffic.

Moreover, whether to permit connection or not may be controlled based on the kind of data used for communication and the number of connections. When data requiring real-timeness such as streaming moving image data is included as the kind of data, whether to permit connection or not is controlled by processing similar to that of the above-described embodiment with weights being assigned so that the number of connections substantially increases.

(2) While the number of connections increases by one when one communication terminal connects to the communication module, a structure may be adopted where when a specific communication terminal is connected, the number of connections increases by a value higher than one (for example, two). The specific communication terminal 3 is identified by a MAC address or the like, or a user ID or the like.

(3) While in the above-described embodiments, the communication terminal 3 is connected to any of the two communication modules Ma10 and Mb20 in the communication control processing, the communication terminal 3 may be connected to any of three or more communication modules. In this case, the control portion 50 controls whether to permit connection or not in response to the request from the communication terminal 3 based on the relation of the number of connections corresponding to the three or more communication modules.

(4) When there are three or more communication modules to which the communication terminal 3 is connectable, it may be made possible to change the target of connection to a specific module by using a function called so-called band-steering. For example, when the communication modules Ma10 and Mb20 perform communication in the 5 GHz band and another performs communication in the 2.4 GHz band, the control portion 50 may perform control so that the communication terminal 3 connecting at 2.4 GHz by band steering connects to either of the communication modules Ma10 and Mb20. As the connection destination thereof, the communication module with a smaller number of connections may be specified.

(5) When a specific channel in the 5 GHz band is used at the communication modules Ma10 and Mb20, it is necessary to mount a DFS (Dynamic Frequency Selection) function. In this case, a period occurs where use is temporarily impossible because of detection of a specific radar signal. When such a situation occurs at either of the communication modules, control may be performed so that the target of connection of the communication terminal 3 is switched to the remaining communication module during that period. For example, during this period, the control portion 50 performs control so as to permit connection to the communication modules irrespective of the numbers Ca and Cb of connections.

(6) Assuming a case of a situation where the communication terminal 3 readily transmits a connection request to either one of the communication modules Ma10 and Mb20, whether to permit connection or not may be controlled only for some communication modules.

As described above, according to an embodiment of the present invention, a control device is provided that includes a control portion that controls a first module and a second module. Further, the following structures may be adopted:

First identification information for connecting to the first module and second identification information for connecting the second module may be the same.

Both of the first identification information and the second identification information may include an SSID.

The radio communication of the first module and the radio communication of the second module may use the same frequency band.

The control portion may refuse the connection of the communication terminal to the first module when the first number of connections becomes larger than the second number of connections by not less than a predetermined number.

The control portion may permit connection to the first module irrespective of the first number of connections and the second number of connections when a request for connection to the first module is again made from the communication terminal having connected to the first module.

The control portion may permit connection to the first module irrespective of the first number of connections and the second number of connections when a request for connection to the first module is made from the communication terminal having connected to the first module before a predetermined time elapses from a last connection.

The control portion may control whether to permit the communication terminal having made the request for connection to the first module to connect to the first module or not based on the first number of connections, the second number of connections, a communication situation of the first module and a communication situation of the second module.

The control portion may permit connection to the first module irrespective of the first number of connections and the second number of connections during a period where the communication by the second module is impossible.

What is claimed is:

1. A control device comprising:
a memory that stores instructions; and
a processor that executes the instructions,
wherein the instructions cause the processor to perform:
controlling, based on a first number of communication terminals to which a first wireless communication module performs radio communication and a second number of communication terminals to which a second wireless communication module performs radio communication, whether to permit the communication terminal having made a request for connection to the first wireless communication module to connect to the first wireless communication module or not.

2. The control device according to claim 1, wherein first identification information for connecting to the first wireless communication module is same information as second identification information for connecting to the second wireless communication module.

3. The control device according to claim 2, wherein each of the first identification information and the second identification information includes an SSID.

4. The control device according to claim 1, wherein the radio communication of the first wireless communication module and the radio communication of the second wireless communication module use a same frequency band.

5. The control device according to claim 1, wherein the instructions cause the processor to perform:
refusing the connection of the communication terminal having made the request for connection to the first wireless communication module to the first wireless communication module when the first number of communication terminals becomes larger than the second number of communication terminal by not less than a predetermined number.

6. The control device according to claim 1, wherein the instructions cause the processor to perform:
permitting the communication terminal having made the request for connection to the first wireless communication module to connect to the first wireless communication module irrespective of the first number of communication terminals and the second number of communication terminals when a request for connection to the first wireless communication module is again made from the communication terminal that had connected to the first wireless communication module.

7. The control device according to claim 1, wherein the instructions cause the processor to perform:
permitting the communication terminal having made the request for connection to the first wireless communication module to connect to the first wireless communication module irrespective of the first number of communication terminals and the second number of communication terminals when the request for connection to the first wireless communication module is made from the communication terminal before a predetermined time elapses from a disconnection of the communication terminal from the first wireless communication module.

8. The control device according to claim 1, wherein the instructions cause the processor to perform:
controlling whether to permit the communication terminal having made the request for connection to the first wireless communication module to connect to the first wireless communication module or not based on the first number of communication terminals, the second number of communication terminals, a communication situation of the first wireless communication module and a communication situation of the second wireless communication module.

9. The control device according to claim 1, wherein the instructions cause the processor to perform:
permitting the communication terminal to connect to the first wireless communication module irrespective of the first number of communication terminals and the second number of communication terminals during a period where the second wireless communication module is unable to connect to any communication terminals.

10. A communication relay device comprising:
the control device according to claim 1; and
at least one of the first wireless communication module and the second wireless communication module.

11. A communication system comprising:
the control device according to claim 1;
the first wireless communication module; and
the second wireless communication module.

12. A control method comprising:
controlling, based on a first number of communication terminals to which a first wireless communication module performs radio communication and a second number of communication terminals to which a second wireless communication module performs radio communication, whether to permit a communication terminal having made a request for connection to the first wireless communication module to connect to the first wireless communication module or not.

13. The control method according to claim 12, wherein first identification information for connecting to the first wireless communication module is same information as second identification information for connecting to the second wireless communication module.

14. The control method according to claim 13, wherein each of the first identification information and the second identification information includes an SSID.

15. The control method according to claim 12, wherein the radio communication of the first wireless communication module and the radio communication of the second wireless communication module use a same frequency band.

16. The control method according to claim 12, further comprising:
refusing the connection of the communication terminal having made the request for connection to the first wireless communication module to the first wireless communication module when the first number of communication terminals becomes larger than the second number of communication terminal by not less than a predetermined number.

17. The control method according to claim 12, further comprising:
permitting the communication terminal having made the request for connection to the first wireless communication module to connect to the first wireless communication module irrespective of the first number of communication terminals and the second number of communication terminals when a request for connection to the first wireless communication module is again made from the communication terminal that had connected to the first wireless communication module.

18. The control method according to claim 12, further comprising:
permitting the communication terminal having made the request for connection to the first wireless communication module to connect to the first wireless communication module irrespective of the first number of communication terminals and the second number of communication terminals when the request for connection to the first wireless communication module is made from the communication terminal before a predetermined time elapses from a disconnection of the communication terminal from the first wireless communication module.

19. The control method according to claim 12, further comprising:
controlling whether to permit the communication terminal having made the request for connection to the first wireless communication module to connect to the first wireless communication module or not based on the first number of communication terminals, the second number of communication terminals, a communication situation of the first wireless communication module and a communication situation of the second wireless communication module.

20. The control method according to claim 12, further comprising:
permitting the communication terminal to connect to the first wireless communication module irrespective of the first number of communication terminals and the second number of communication terminals during a period where the second wireless communication module is unable to connect to any communication terminals.

* * * * *